United States Patent [19]

Chick

[11] Patent Number: 5,181,010
[45] Date of Patent: Jan. 19, 1993

[54] AUTOMOTIVE SECURITY SYSTEM WITH DISCRIMINATION BETWEEN TAMPERING AND ATTACK

[76] Inventor: James S. Chick, 6199 Canterbury Dr., #302, Culver City, Calif. 90230

[21] Appl. No.: 656,113

[22] Filed: Feb. 13, 1991

Related U.S. Application Data

[63] Continuation of Ser. No. 228,603, Aug. 4, 1988, abandoned.

[51] Int. Cl.⁵ ............................................. B60R 25/10
[52] U.S. Cl. ................................... 340/426; 340/428; 340/429; 340/522; 307/10.2
[58] Field of Search ............... 340/426, 428, 429, 521, 340/522, 517; 307/10.2

[56] References Cited

U.S. PATENT DOCUMENTS

| | | | |
|---|---|---|---|
| 3,074,053 | 1/1963 | McDonough et al. | |
| 3,801,978 | 4/1974 | Gershberg et al. | |
| 4,067,411 | 1/1978 | Conley et al. | 340/426 X |
| 4,195,286 | 3/1980 | Galvin | 340/522 X |
| 4,243,979 | 1/1981 | Kleinschmidt | 340/554 |
| 4,275,390 | 6/1981 | Heywang et al. | 340/554 |
| 4,401,976 | 8/1983 | Stadelmayr | 340/522 |
| 4,437,089 | 3/1984 | Achard | 340/522 X |
| 4,574,268 | 3/1986 | Ohnishi | 340/542 |
| 4,612,530 | 9/1986 | Kurth et al. | 340/691 |
| 4,638,292 | 1/1987 | Mochida et al. | 340/825.32 |
| 4,660,024 | 4/1987 | McMaster | 340/522 |
| 4,688,036 | 8/1987 | Hirano et al. | 340/825.69 |

Primary Examiner—Jin F. Ng
Assistant Examiner—Jeffery A. Hofsass
Attorney, Agent, or Firm—Christensen, O'Connor, Johnson & Kindness

[57] ABSTRACT

A vehicle security system provided with a plurality of environmentally sensitive sensors determines the number of environmentally sensitive sensors that are activated, and generates an attack alarm signal when at least a predetermined number of environmentally sensitive sensors are activated, the predetermined number being greater than one, and generates a tamper alarm signal when a number of environmentally sensitive sensors less than the predetermined number are activated. In a system having one or more environmentally insensitive sensors and a plurality of environmentally sensitive sensors, an attack alarm signal is generated when an environmentally insensitive sensor is activated or at least a predetermined number of environmentally sensitive sensors are activated, the predetermined number being greater than one, and a tamper alarm signal is generated when no environmentally insensitive sensor is activated and a number of environmentally sensitive sensors less than the predetermined number are activated. The attack alarm signal is used to activate a first alarm indicator, and the tamper alarm signal is used to activate a second alarm indicator.

25 Claims, 5 Drawing Sheets

AUTOMOTIVE SECURITY SYSTEM WITH DISCRIMINATION BETWEEN TAMPERING AND ATTACK

This is a continuation of application Ser. No. 228,603, filed on Aug. 4, 1988, now abandoned.

BACKGROUND OF THE INVENTION

1. Field of the Invention

This invention relates to automotive security systems and, more particularly, to automotive security systems that activate an alarm signal when the vehicle is disturbed.

2. Description of the Related Art

Vehicle security systems may be generally described as including five basic elements. They are (1) sensors to detect disturbances to the vehicle; (2) a deterrent subsystem, for example, audible and visual indicators and anti-theft locks; (3) a control mechanism for arming and disarming the security system; (4) a power supply to operate the system; and (5) a control unit that functionally interconnects all of the other elements.

Vehicle security systems are employed in the hope of deterring and preventing persons from damaging or stealing a parked and unattended vehicle, or gaining unauthorized entry. When a vehicle is disturbed, one or more of the sensors are activated, or tripped, and the security system control unit generates an alarm signal. The alarm signal may be used to activate a remote device, such as a pager, or a vehicle-mounted device, such as a siren, flashing lights, an ignition prevention interlock, or some combination of these and other devices.

Many automotive security systems make use of contact switches as the sensors that activate the alarm indicators. Contact switches rely on the relative movement between vehicle panel members, such as movement between a door or trunk lid and the car body. The opening of a door or trunk lid activates the electrical contacts of a switch, which causes the security system to cycle the alarm. Vehicle security system alarm indicators include loud sounds such as sirens and horns, and flashing lights that are usually used in an attempt to frighten off the intruder. Additionally, the alarm signal may disable the vehicle ignition or fuel delivery systems to prevent the vehicle from being driven away. Examples of such systems, often provided by vehicle manufacturers themselves, are shown in U.S. Pat. Nos. 4,612,530; 4,638,292; 4,688,036; and 4,574,,268.

Contact switches are advantageous in that no false alarms are generated. That is, once the security system is enabled by the user, any opening of a door or trunk lid is an unauthorized opening and activates the alarm. A great disadvantage of such contact switches is that the system is insensitive to changes in the environmental conditions that are common with an unauthorized entry. For example, smashing open a vehicle window would not cause activation of a contact switch at the door or trunk.

More effective vehicle security systems have been provided primarily as a result of an improved ability to detect disturbances. This has occurred through the use of increasingly sophisticated sensor technology and the varied methods of responding to the sensors. These security systems make use of sophisticated sensors that are sensitive to disturbances in the environment around and within the vehicle. These environmentally sensitive sensors may be used in place of or in addition to contact switches. The sophisticated sensors, primarily introduced and used by the independent vehicle security industry, include movement or vibration sensors and acoustic sensors.

Motion sensors detect movement of the vehicle that may indicate attempted towing of the vehicle, raising the vehicle for removal of wheels, or the presence of an intruder within the vehicle's passenger compartment, trunk, or engine bay. Acoustic sensors are used primarily to detect breaking glass, such as a vehicle window being smashed open.

Some of these environmentally sensitive sensors, such as the motion sensors and acoustic sensors, are currently being used in vehicle security systems. When the vehicle is moved or a vibration is transmitted through the vehicle to the motion sensor, that sensor is activated, or tripped. Similarly, when a sound in the proper frequency range occurs in the vicinity of the acoustic sensor, that sensor is activated. Upon activation of one of the sensors, the security system in turn generates an alarm, hopefully scaring off an intruder or thief in the process of tampering with the vehicle. Unfortunately, many physical and acoustic "disturbances" to a vehicle are inadvertent or are part of the surrounding environment. These disturbances are sufficient to trigger the environmentally sensitive sensors and therefore the security system, but are not harmful and do not affect the vehicle. Generation of alarms resulting from these events are characterized as false alarms. For example, heavy trucks driving by may cause vibrations that trigger the motion sensor, or police car sirens and honking horns may activate the acoustic sensor.

Other sensors are also known. Ultrasonic transducers may be used to detect, for example, changes in air movement that may indicate a window that has been broken open. Another common form of intrusion sensor detects electromagnetic radiation. The electromagnetic spectrum includes microwave energy, visable light, and infrared radiation. Such intrusion detection sensors are widely employed in premise protection systems, but are rarely used in conjunction with vehicle security systems because of their high false alarm rate.

Presently, electromagnetic intrusion detection sensors are impractical for use in vehicle security systems because of their relatively large size and cost. These sensors are highly sensitive to any environmental change and therefore are also more likely to indicate false alarms than are the previously mentioned sensors. Nevertheless, they are also more likely to detect entry within the vehicle and could "back up" or overlap with other sensors. For example, such sensors can detect air movement within the vehicle as a result of a window being broken open, and could thereby trigger an alarm if the sound sensor malfunctioned or otherwise failed to detect the broken window. As the technology improves, and the detection units associated with the sensors become smaller and more cost effective, their application in vehicle security systems will become practical. Unfortunately, the high false alarm rate associated with these sensors has not been dealt with in the automotive context.

Typically, any single tripped sensor in an automotive security system is sufficient to trigger an alarm. Prior art vehicle security systems therefore cannot utilize the full sensor sensitivity available. A single sensor has a difficult time discriminating between a genuine intrusion or attack and the peak conditions of the ambient environment. All of the sensor types described above have variable levels of detection sensitivity to compensate for the environmental extremes in which they operate. The sensor may have a threshold level of detection much lower than that experienced in the ambient environment. The sensitivity level must be adjusted to a stimulus level much higher than the sensor threshold level of detection in order to reduce false alarms. For example, an acoustic sensor may be capable of detecting very faint sounds, but this capability usually cannot be fully utilized because of the false alarms that would be generated.

The majority of vehicle alarms heard by the public are false alarms. This is due to the sensor's trip threshold, or sensitivity of sensor detection levels, being adjusted below that of peak environmental levels. These decreased threshold sensitivity levels are used in the hope of increasing the sensitivity of detecting disturbances to or tampering with the vehicle. Most false alarms are triggered by activation of a single sensor operating in a single physical medium. True attacks against a vehicle, however, usually involve multiple diverse media, such as the audible sound and physical motion created by breaking a window, or involve a stimulus over an extended period of time, such as the continuous motion caused by towing a vehicle.

In addition, many vehicle security systems use a light or a tone generator constantly pulsing on and off in order to indicate the presense of an alarm system and to ward off potential intruders. The disadvantage of these devices is that small flashing lights cannot be seen well in the light of day and pulsating tones are annoying and keep people awake at night. Therefore, such warning devices are either ineffective or are a nuisance.

SUMMARY OF THE INVENTION

The present invention provides increased sensitivity to tampering along with increased resistance to generating false alarms by providing a control system that organizes the security system sensors into two groups. These groups comprise environmentally insensitive sensors, such as the contact switches that are virtually immune to false alarms, and environmentally sensitive sensors. Furthermore, two different security system responses are generated, an "attack" signal and a "tamper" signal. Activation of any one of the false alarm resistant sensors is sufficient to trigger an attack alarm signal. At least two of the environmentally sensitive sensors must be tripped in order to generate an attack alarm signal, indicating an attack event. The exact number of tripped environmentally sensitive sensors necessary to indicate an attack specifically depends on the number and type used in the particular security system.

If the number of environmentally sensitive sensors tripped is less than that necessary for an attack signal, the second alarm signal, referred to as a tamper signal, may be generated. Tamper signals can only be generated by the activation of environmentally sensitive sensors. Additionally, the exact number of active sensors required is at least one but always less than the number required to start the attack alarm. The tamper warning signal is preferably used to initiate a non-intrusive alarm, while the attack signal is used to initiate a full, attention gathering alarm. The tamper signal is initiated upon activation of a predetermined number (which may be equal to one) of sensors, while the attack signal requires the simultaneous activation of a predetermined number greater than one of environmentally sensitive sensors, or any of the environmentally insensitive sensors. In addition, the attack signal is generated when a combination of sensors is continuously activated. The use of the sensor grouping and dual response signals provide the unique discrimination of the present vehicle security system. In contrast, vehicle security systems of the prior art respond identically to activation of any single sensor at any time.

Sensors can easily detect someone leaning on a vehicle, but prior art alarm systems will interpret the motion as an attack against the vehicle because of the lack of discrimination and single alarm signal generated. The discrimination of the present invention is preferably used to generate either a minimal audible or visual response to tampering, while a full deterrent response is generated when an attack is detected. The discrimination ability of the present invention, coupled with the less intrusive tamper alarm, provide a response to tampering to warn off a possible attacker, without generating a full alarm. Therefore, the discrimination ability and two-tier alarm provide an improved warning mechanism over the commonly used continuously pulsating light or beeper in warning a potential intruder of the presence of a security system. This greatly reduces the environmental noise pollution from erroneously generated false alarms and can encourage a better response from the public toward true attack alarms.

Because the present invention uses a combination of circuitry to provide the discrimination between attack and tampering, a malfunction of any single sensor could hamper the system's ability to generate appropriate attack or tamper signals. Therefore, the present invention also incorporates an automatic and a manual means to disable or bypass any sensor and prevent it from adversely affecting the performance of the/ discrimination process.

The present invention also provides a diagnostic function that indicates when a sensor shows no activity for a predetermined time interval. The sensors that rely on a medium that is affected by the ambient environment are expected to periodically show activity to prove their proper functioning. If those environmentally affected sensors show no activity within the predetermined time interval, an indicator is activated to inform the system user that there is a possible sensor malfunction. This same principle is applied to sensors that are not affected by the environmental conditions, such as the door, hood, and trunk contact switches. Generally, the period required between activation of these sensors should be set greater than that of the sensors affected by the ambient environment, since some of these sensors, such as the hood or trunk, may not be frequently activated.

The novel features that are believed to be characteristic of the invention, together with further objectives and advantages thereof, will be better understood from the detailed description considered in connection with the accompanying drawings. It should be expressly understood, however, that the drawings are for purposes of illustration and description only and are not intended as a definition of the limits of the invention. The scope of the invention is best determined by reference to the appended claims.

DETAILED DESCRIPTION OF THE DRAWINGS

Figure 5:
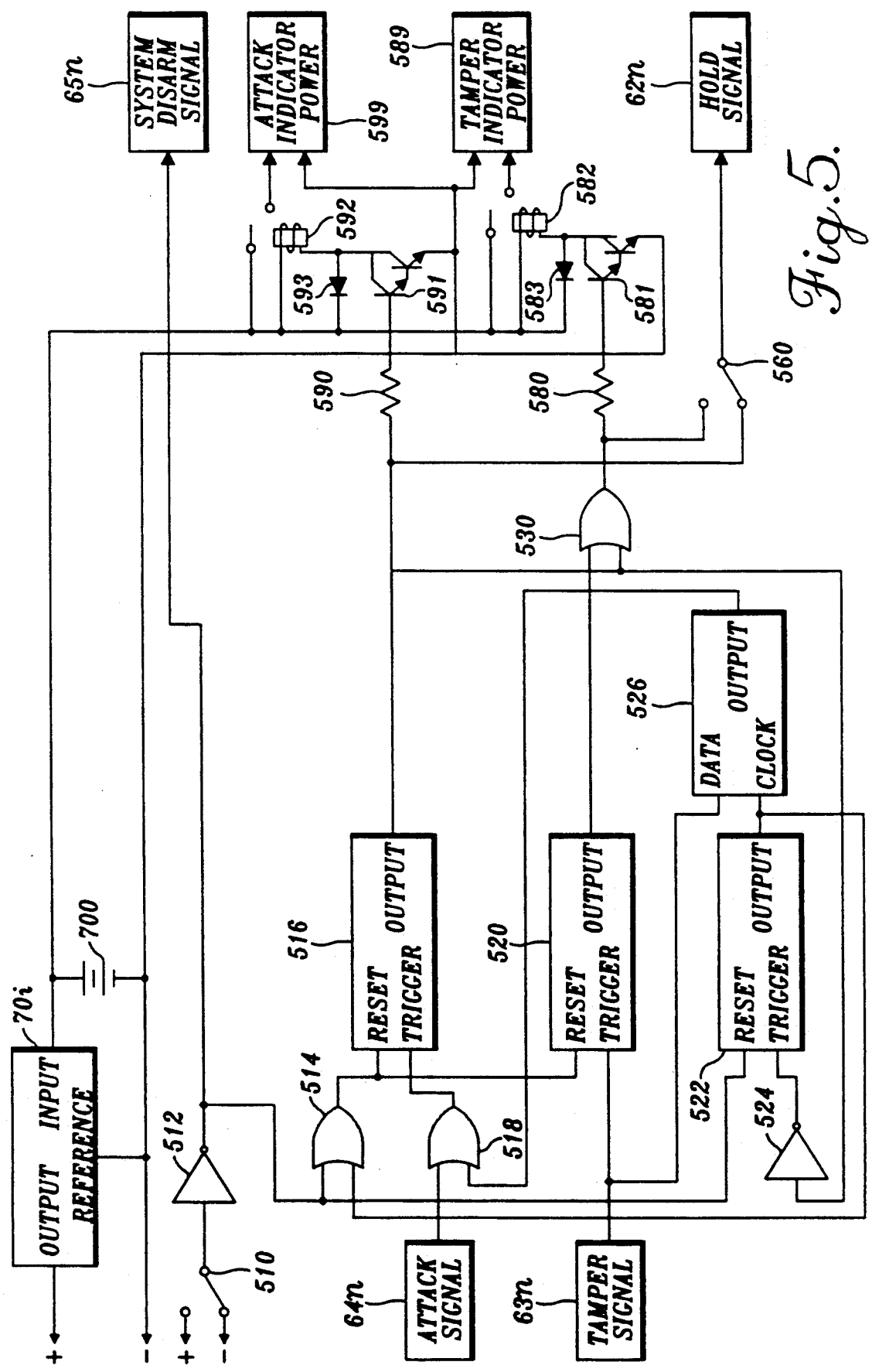
FIG. 5 shows a circuit block diagram of the system control function of the present invention.

Referring to FIG. 5, the power source for the alarm system is shown as a battery 700. The minus side of the battery 700 is connected to all minus (−) voltages illustrated in any figure and to the reference voltage terminal of a voltage regulator 701. Said reference voltage also represents the normal state of the sensors and the inactive state in most of the system's logic. The positive side of the battery 700 is connected to the input terminal of the voltage regulator 701. The output of the regulator provides a stable operating voltage for the system. The output of the regulator 701 is connected to all positive (+) voltages illustrated. Said positive voltage represents the active state of the detection sensors and represents the active state in most of the system's logic.

Figure 1:
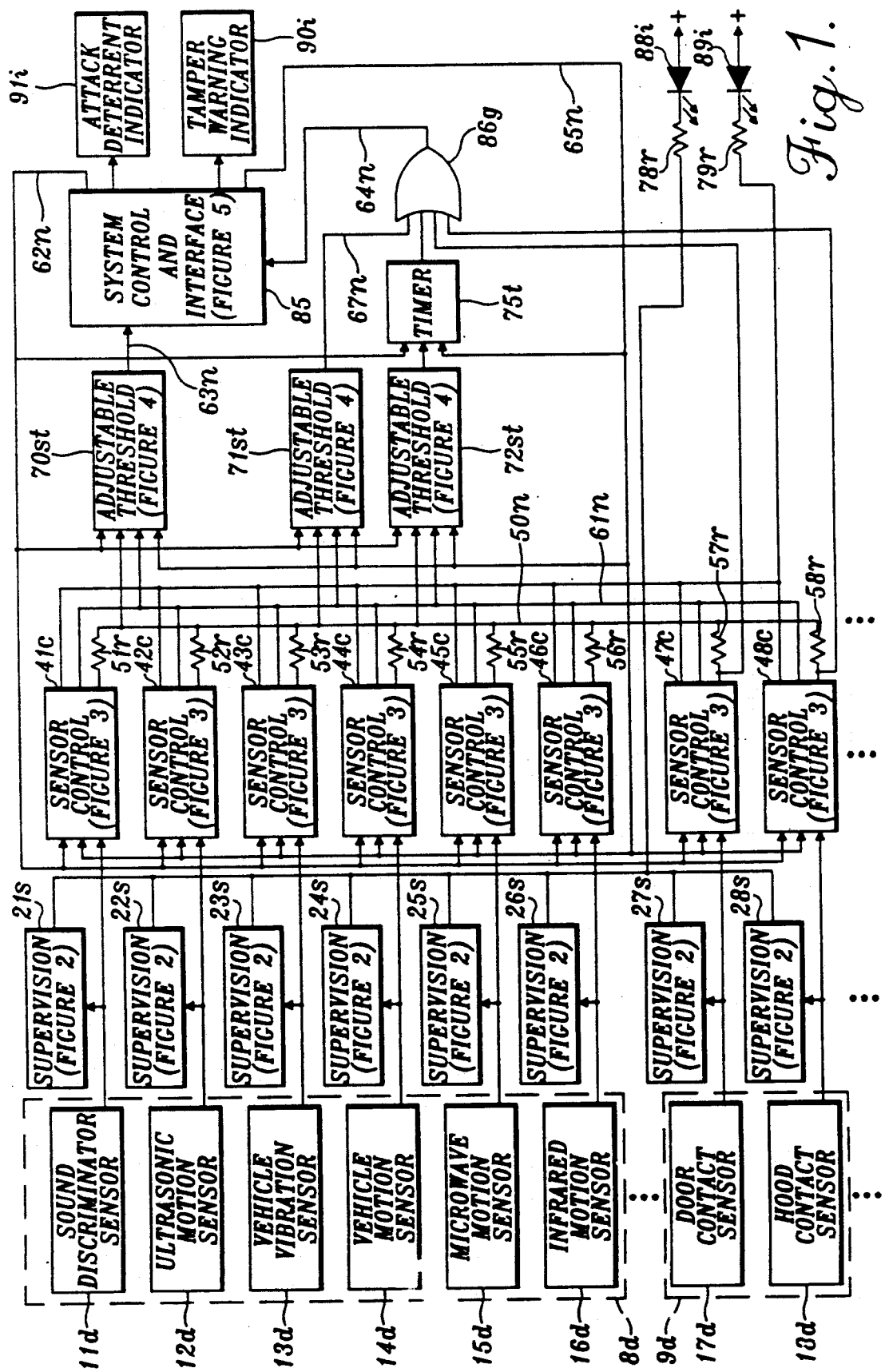
FIG. 1 is a block circuit diagram showing the principle of the vehicle security system of the present invention.

Referring to the block logic circuit diagram of FIG. 1, there are two groups of detection sensors used to supply input signals to the system. The detection sensors are denoted with a "d" suffix. The first sensor group 8d includes those which are affected by ambient environmental conditions. This group includes a sound discriminator sensor 11d, an ultrasonic motion sensor 12d, a vehicle vibration sensor 13d, a vehicle motion sensor 14d, a microwave motion sensor 15d, and an infrared motion sensor 16d. The second sensor group 9d includes those sensors that are not affected by the ambient environment. This group 9d includes a door contact sensor 17d and a hood contact sensor 18d. These sensors can be any well known type, providing they have a compatible output in response to the intended sensed condition. The sensors shown are not the only possible combination, but rather are a representative sampling of the types of sensors presently available.

Figure 2:
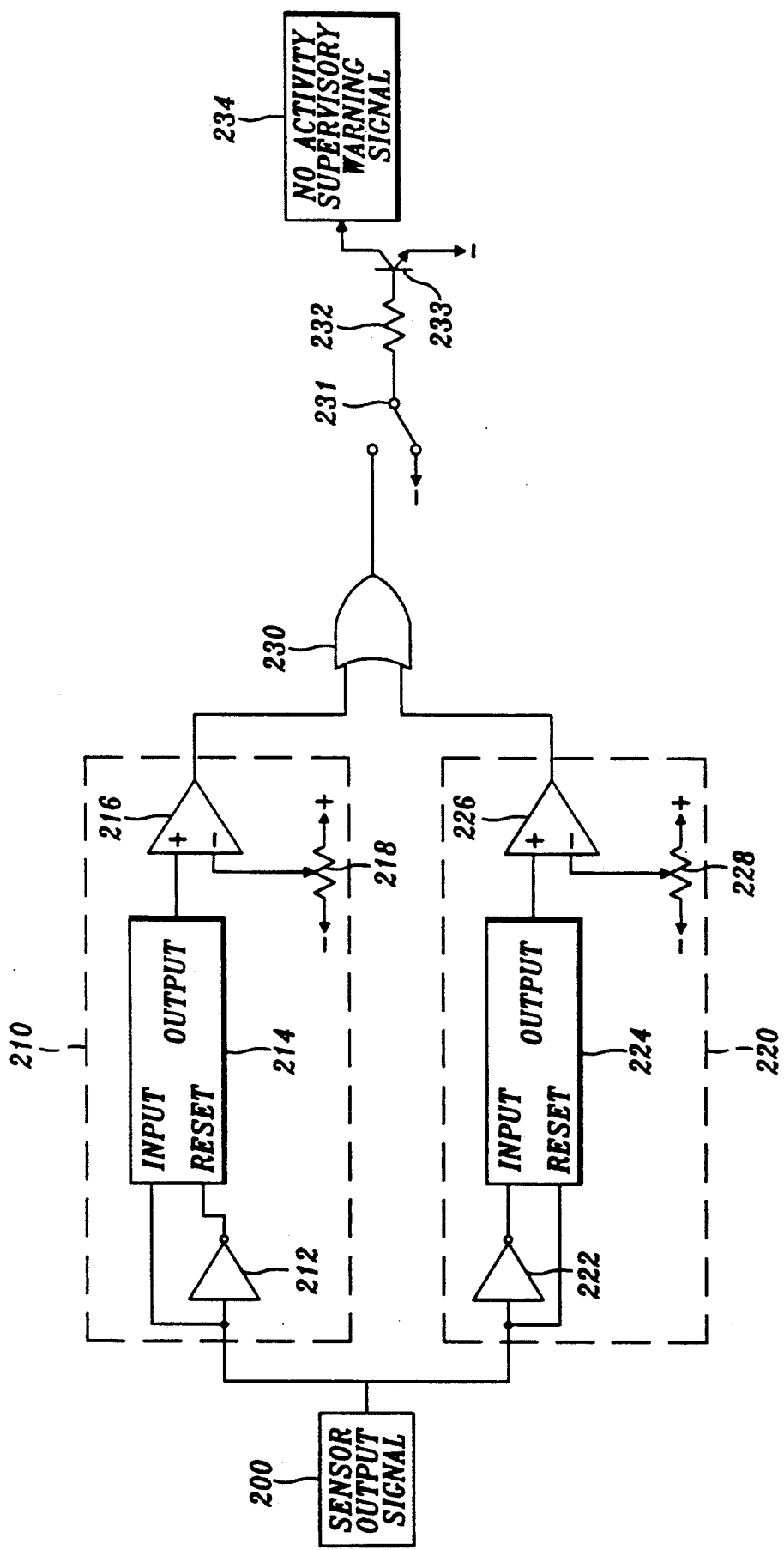
FIG. 2 is a block diagram showing the diagnostic function of the present invention.
Figure 3:
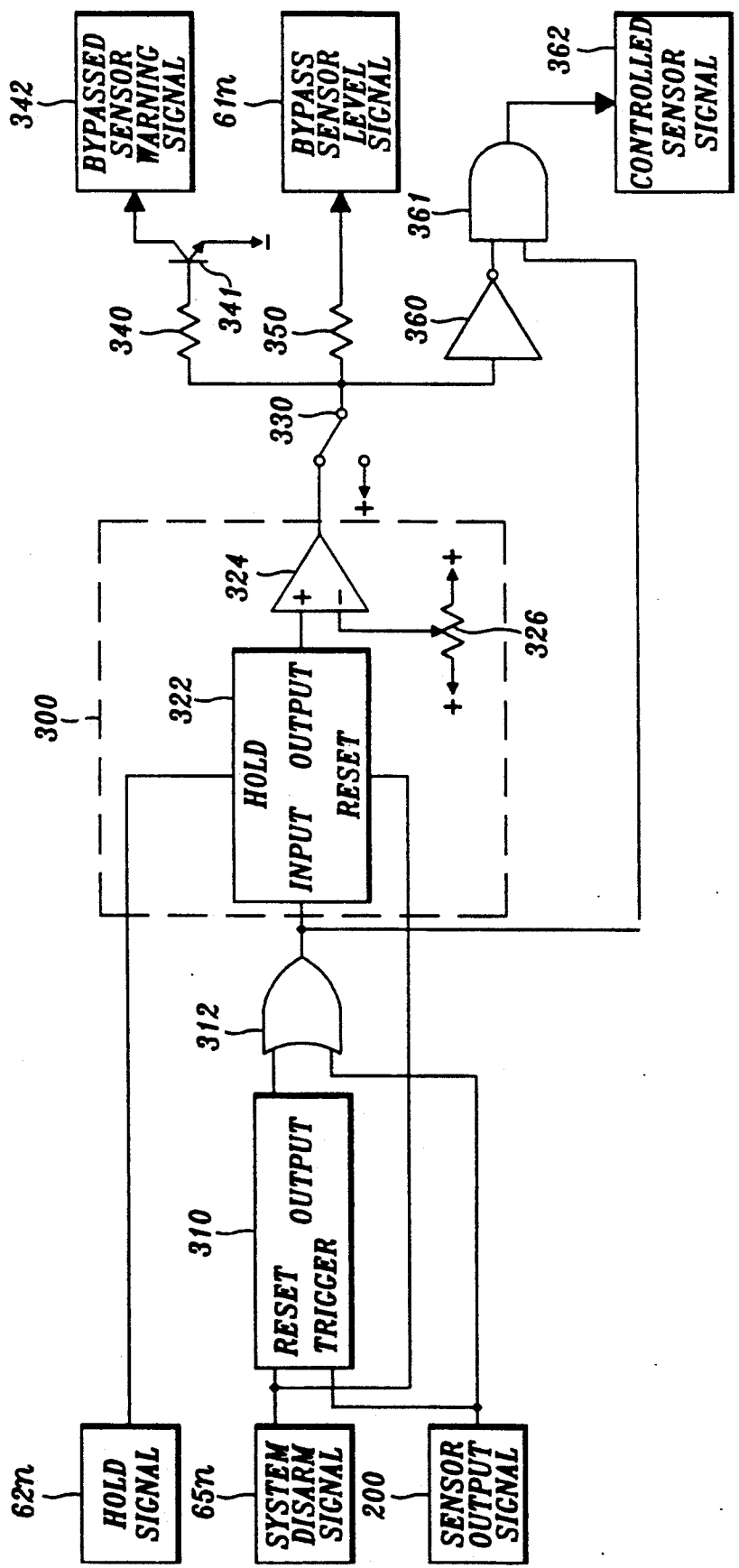
FIG. 3 is a block circuit diagram of the sensor signal conditioning, manual, and automatic bypass features of the present invention.

The output signal from each of the sensors is connected to the input of an associated supervision circuit, denoted by a numeral with an "s" suffix. Each of the eight sensors is connected to, respectively, block 21s, 22s, 23s, 24s, 25s, 26s, 27s, or 28s of FIG. 1. A circuit to achieve the desired supervision is shown in FIG. 2. In addition to being connected to a supervision circuit, the output signal from each of the sensors is connected as the input to the sensor control circuits, which are denoted by numerals with the "c" suffix. That is, each of the eight sensors is connected to, respectively, sensor control circuit 41c, 42c, 43c, 44c, 45c, 46c, 47c, or 48c. A circuit for achieving the desired sensor control is shown in FIG. 3.

Referring to FIGS. 1 and 2, the output signal 200 from each sensor is used as an input signal to the supervision circuit detailed in FIG. 2. Referring to FIG. 2, the sensor output signal 200 is connected as the input to a normal state detector 220, or non-tripped sensor, and to an active state detector 210. These detector blocks generate a signal whenever the input stays in either the active (the detector 210) or normal state (the detector 220) for a manually selected time interval.

The active state detector 210 of FIG. 2 measures the duration of the active state of the sensor output signal 200. Said signal 200 is connected directly to the input of an integrator 214. The integrator output is connected to the positive (+) input of a threshold comparator 216. The minus (−) input of the comparator 216 is connected to the manually adjustable armature of a potentiometer 218. The armature adjustment selects a voltage level anywhere between the positive (+) output level of the voltage regulator 701 and the minus (−) system voltage of the battery 700. The output of the comparator 216 becomes active, or generates an output signal, when the integrator output reaches the selectable voltage threshold applied to the minus (−) input of the comparator. The active state detection integrator 214 is enabled only when the associated sensor output signal 200 is active, and the output is held at reset during the time the input state is normal. The integration level of the integrator 214 is reset to zero via the interconnection between the sensor output signal 200, the inverter 212, and the reset terminal of the integrator 214. That is, while the associated sensor output signal 200 is inactive, the output of the inverter 212 holds the reset of the integrator 214 active.

The normal state detector 220 illustrated in FIG. 2 measures the duration of the normal state of the output signal 200. Said signal 200 is inverted by an inverter 222, and then connected to the input of an integrator 224. Thus, the input of the integrator 224 is active whenever the signal 200 is not active. The output of the integrator is connected to the positive (+) input of a threshold comparator 226. The minus (−) input of the comparator is connected to the manually adjustable armature of a potentiometer 228. The output of the comparator 226 becomes active, or generates a signal, when the output voltage level of the integrator 224 reaches the voltage threshold selected by the minus (−) input of the comparator. The normal state detection integrator 224 is enabled, or generates a signal, only when the associated sensor output signal 200 is normal, or not tripped. The integrator's level is reset to zero while the input state is active, or when the sensor is tripped. The reset of the integrator is provided by the interconnection between the sensor output signal 200 and the reset terminal of the integrator 224. While the associated sensor output signal 200 is active, the reset of the integrator 224 is held active.

The output signals from the threshold comparators 216 and 226 are logically ORed together by an OR gate 230. The resulting output of the OR gate 230 is generated when the associated sensor has shown no activity during the manually selectable time intervals. The manual override switch 231 selects between the output of the OR gate 230 and the inactive warning state, denoted as the minus (−) terminal of the override switch. The signal selected by the switch 231 propagates through the current limiting resistor 232 to the base of a transistor 233 which generates an open collector, active, low, no activity, supervisory warning signal 234. This requires that the emitter of the transistor 233 is connected to the minus (−) side voltage of the system.

Referring to FIGS. 1 and 2, all of the no activity supervisory warning signals from the supervision circuits are interconnected to one another and to a current limiting resistor 78r. The opposite side of the resistor 78r connects to the cathode of a light emitting diode (LED) indicator 88i. The anode of the indicator 88i is connected to a positive voltage supply denoted as (+).

The LED indicator 88i is turned on whenever any sensor has shown no activity for the time interval set by a supervision circuit, if the associated supervisory warning signal is not disabled by the manual override switch 231.

In order to reset the indicator 88i, the associated sensor or sensors must change output states or be manually disabled. In the supervision circuits detailed in FIGS. 1 and 2, the ambient environment provides the sensor stimulation used to reset the active state detector 210 and the normal state detector 220. This unique logic allows the performance of the sensors to be checked for proper functioning. The sensors which use a media that is subject to stimulation by the peak ambient environment are expected to show activity more often than the sensors which are not affected by the ambient environment.

Referring to FIGS. 1 and 3, each sensor output signal 200 is also connected to the trigger of a resettable monostable multivibrator 310 (also known as a one-shot). A multivibrator outputs a pulse voltage when triggered. The trigger terminal of the multivibrator 310 is activated whenever the sensor output signal 200 is in the active state. The multivibrator is held in a reset, inactive state while the system disarm signal 65n is enabled. The disarm signal 65n is enabled whenever the user has turned off the security system. This operation is further described in FIG. 5. The output of the multivibrator 310 is applied to one input of an OR gate 312, after which it is applied to the input terminal of a resettable integrator 322 with hold. The second input of the OR gate 312 allows the sensor output signal 200 to propagate to the input terminal of the integrator 322.

The multivibrator 310 and OR gate 312 together generate a compensated (i.e., prolonged or stretched) sensor detection signal to ensure an overlapping response from all sensors detecting the same attack or tamper event. This synchronizes the sensors together so that the control system does not "miscount" the number of tripped sensors. The resulting output signal produced by the OR gate 312 has a minimum duration equal to the active output duration of the multivibrator 310. The maximum duration of the output signal of the OR gate 312 is that of the associated sensor output signal 200, if said signal has a longer duration than the output signal produced by the multivibrator 310. The output of the OR gate 312 is also connected to the AND gate 361, where it is used to form part of the controlled sensor signal 362 described below.

Block 300 of FIG. 3 indicates the elements of a timer with hold. The timer sums the voltage pulses produced by the multivibrator 310, and generates an output signal when the sum reaches a predetermined level, as described below. The hold function of the integrator 322 provides a means to hold the integrator's output value steady during the active state of the hold signal 62n. The hold signal is in an active, or enabled state when the attack or tamper indicators are active, or tripped, as discussed below in the description of FIG. 5.

The integrator 322 is held in a reset, inactive state whenever the system disarm signal 65n is in an active state. The OR gate 312 provides the signal to be integrated by the integrator 322. The output of the integrator 322 is connected to the positive (+) input of a threshold comparator 324, which generates an active output signal when the integrator's output reaches the minus (−) input voltage level selected by the manually adjustable armature of a potentiometer 326. Active integration takes place only when both the hold signal 62n and the system disarm signal 65n are inactive. Thus, the output of the circuit 300, which is the output of the comparator 324, is in an active state when a corresponding sensor has generated an active detection signal with a duration as defined by the integration rate of the integrator 322 and the threshold selected by the potentiometer 326.

The signal produced by the timer circuit 300 is connected as an input to a switch 330. The switch 330 selects between the output signal generated by the timer circuit 300 and a static state representing a sensor bypass request state, denoted as a predetermined positive voltage (+). The switch 330 allows the system to continue uninterrupted operation when a sensor is bypassed. The signal selected by the switch 330 is inverted by an inverter 360 and then is applied as an enable signal input of an AND gate 361. When the AND gate 361 is enabled, the output state of the OR gate 312 becomes the state of the controlled sensor signal 362.

The active output of the switch 330 propagates through a current limiting resistor 340 and is used to turn on the base of a transistor 341. The signal produced by the collector of the transistor is the bypassed sensor warning signal 342, which is pulled low (denoted by the (−) connected to the emitter of said transistor) whenever the associated sensor is bypassed. Referring to FIG. 1, the bypassed sensor warning signals from each of the sensor control circuits are interconnected to each other and to a current limiting resistor 79r. The opposite side of the resistor 79r connects to the cathode of a light emitting diode (LED) indicator 89i. The anode side of the indicator 89i is connected to a positive voltage supply denoted by (+). The indicator 89i is on whenever any one of the sensors is bypassed.

The active output signal of the switch 330 also propagates through a resistor 350 to become the bypass sensor level signal 61n. Referring to FIGS. 1 and 3, the interconnection between all bypass sensor level signals, denoted as node 61n, produces a voltage level that is proportional to the quantity of bypassed sensors, since the interconnection of the resistors 350 produces an adder function. In the illustrated embodiment, the voltage level present at the node 61n is one-eighth of the value of positive (+) voltage for each sensor that is bypassed.

Referring to FIGS. 1, 2, and 3, the controlled sensor signals 362 of each of the sensor control blocks 41c, 42c, 43c, 44c, 45c, 46c, 47c, and 48c are summed together by equal value resistors 51r, 52r, 53r, 54r, 55r, 56r, 57r, and 58r, respectively, hereafter referred to as node 50n. This node has a voltage level that is proportional to one-eighth of the value of the positive (+) voltage level for each active (i.e., tripped) sensor signal that is not bypassed. That is, each activated sensor voltage output is added. The two nodes 50n and 61n are connected to the adjustable threshold blocks denoted as 70at, 71at, and 72at in FIG. 1. Additionally, the controlled sensor signals 362 generated by the non-environmentally affected sensor group 9d are connected to the input of an OR gate 86g. The OR gate 86g produces an active output signal, denoted as node 64n, whenever any form of non-environmental sensor attack signal becomes active.

Referring to FIGS. 1 and 2, the adjustable threshold blocks 70at, 71at, and 72at produce an active output signal when a manually selectable quantity of controlled sensor signals 362 become active as a result of an attack or tamper event. The adjustable threshold circuits are shown in more detail in FIG. 4. These circuits provide the attack versus tamper discrimination.

Figure 4:
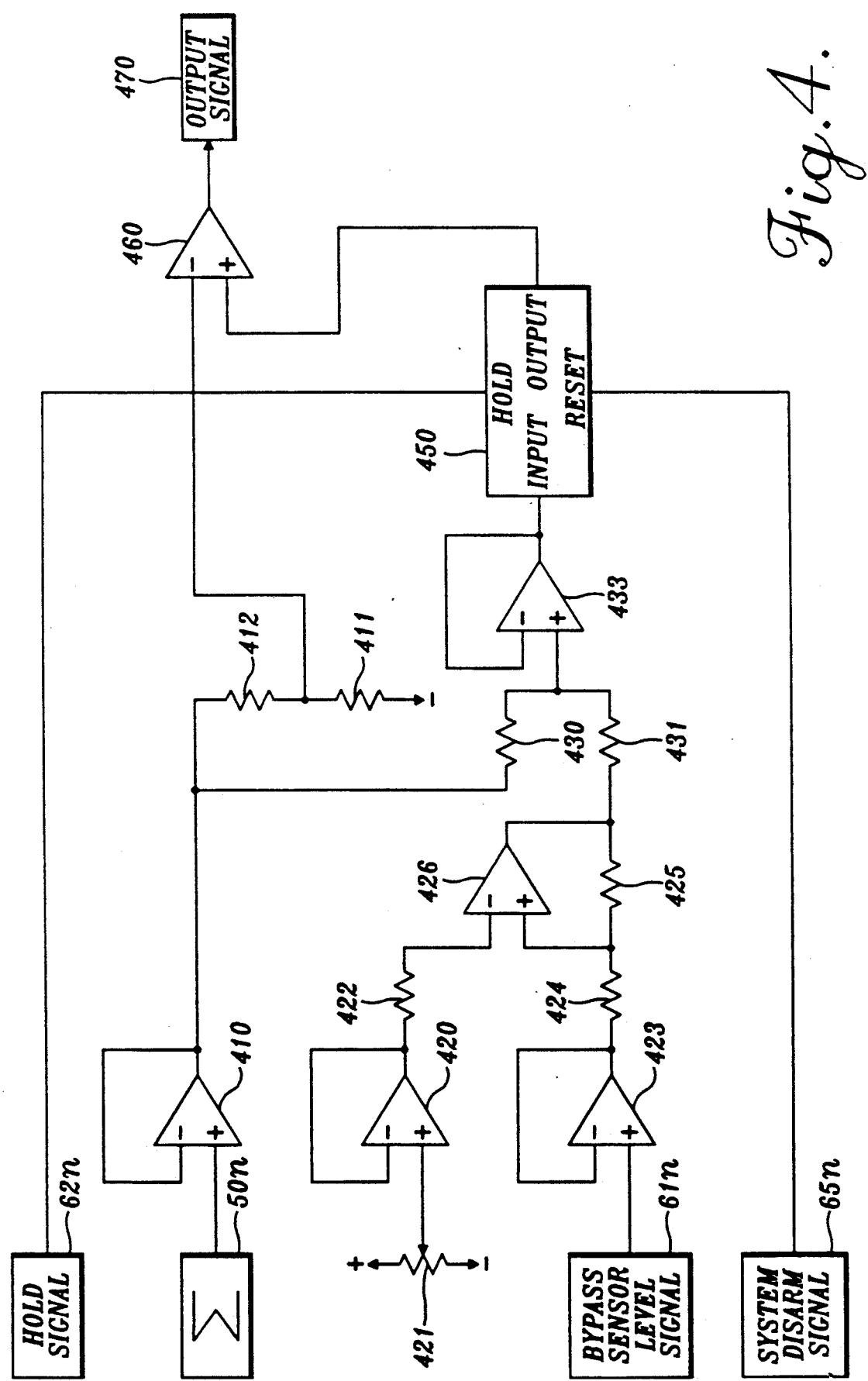
FIG. 4 shows a block circuit diagram for manually and automatically adjusting the attack and tamper detection thresholds.

Referring to FIGS. 1 and 4, a potentiometer 421 is connected between the system voltage levels represented by positive (+) and minus (−), where the manually adjustable armature of the potentiometer allows selection of the quantity threshold trip level. The voltage which is manually selected by the potentiometer 421 is buffered by the op-amp 420. The nodes 50n and 61n are buffered by op-amps 410 and 423, respectively, to prevent the adjustable threshold detectors 70at, 71at, and 72at from interacting. The interconnection of equal-value resistors 422, 424, 425, and the op-amp 426 forms a unity gain differential amplifier, whose output is the difference between the manually selected level of the potentiometer 421 and the quantity level of bypassed sensors of node 61n. Therefore, the output level of the op-amp 426 is automatically lowered whenever a sensor becomes bypassed, so that bypassed sensors do not adversely affect the quantity threshold selected by the potentiometer 421. That is, the adjustable threshold blocks select how many tripped sensors will be necessary for an alarm signal. The differential amplifier is necessary because the threshold trip level should not remain unrealistically high when sensors are bypassed.

The output of the op-amps 410 and 426 are summed together by equal-value resistors 430 and 431, respectively. The resulting summation voltage level is a value proportional to half the number of active sensors and half of the adjusted threshold level produced by the op-amp 426. An op-amp 433 buffers the summation voltage level and applies said signal to the input of a resettable integrator 450 with hold. Active integration takes place only when the hold signal 62n and the system disarm signal 65n are both inactive. The output signal of a comparator 460 is an output signal 470. While the reset of the integrator 450 is active, the integrator's level is reset to the level of its input (i.e., reset to the level of the output of the op-amp 433). While active, the integrator 450 output slowly tracks its input signal. The integrator 450 provides a means to automatically adjust the minus (−) input of the comparator 460, thereby preventing signals caused by ambient conditions from causing a continuous active output signal 470. The buffered signal of the node 50n voltage is divided by two as denoted by equal value resistors 411 and 412. The divided signal is applied to the positive (+) input of the comparator 460 which compares the quantity level of active controlled sensor signals with the automatically adjusted threshold level produced by the integrator 450. The comparator 460 produces an active output signal 470 whenever the level of the corresponding automatically adjustable threshold exceeds the selected quantity level of active sensors.

Referring to FIGS. 1 and 4, the output signal of the adjustable threshold 70at block (denoted as node 63n) is used as the tamper detection signal, which is connected to the control and interface block 85. The output signal of the adjustable threshold 71at block, denoted as node 67n, is used to generate an attack detection signal, and is therefore connected as an input to the OR gate 86g, where all forms of attack are logically ORed together. Node 64n is the output of the OR gate 86g (attack signal), which is connected to the system control and interface block 85. The output of the adjustable threshold 72at block is applied to a timer 75t, which is equivalent in structure to the timer of circuit 300 depicted in FIG. 3. That is, the signals 62n and 65n are the same and are connected to an integrator of the timer 75t, and the integrator's input terminal is connected to the output of the adjustable threshold block 72at. The output of the timer 75t is connected to the OR gate 86g, since the resulting signal is considered a form of attack.

Referring to FIG. 5 for the detailed description of the system control and interface block 85 of FIG. 1, the circuit inputs are the attack signal 64n and the tamper signal 63n. The positive side of the battery 700 is connected to the normally open contacts of relays 582 and 592, as well as one side of both relay coils. Two diodes 593 and 583 are connected across relay coils 592 and 582, respectively. Said diodes protect the Darlington transistors 591 and 581 from the potential voltage spikes encountered when disengaging the inductive relays. The contacts of the relay 592 control the power to the attack indicator 599. The relay contacts of the relay 582 control the tamper indicator power 589.

The purpose of the resettable multivibrator 516 is to generate a signal pulse of proper duration for an attack signal, or to generate an active pulse signal which represents the minimum cycle duration of the attack indicator power 599 upon receipt of an active output signal from the OR gate 518. The OR gate 518 allows the propagation of an active attack signal 64n to trigger the multivibrator 516, thereby starting the attack alarm cycle. The purpose of the resettable multivibrator 520 is to generate an active pulse which represents the minimum cycle duration of the tamper indicator power 589 upon receipt of a tamper signal 63n.

An on/off switch 510 selects between the active armed (enable) state, denoted by the plus (+) sign, and the inactive disarm (disabled) state, denoted by the minus (−) sign. The on/off switch output signal is connected to an inverter 512 whose output becomes the system disarm signal 65n. Referring to FIGS. 1, 3, 4, and 5, the interconnection of the disarm signal 65n is used to inhibit all sensor output signals and reset various system components while the system is disarmed. Since no vehicle entry and exit delays are employed in the illustrated embodiment, the switch 510 would be externally controlled so as to not cause alarms while arming and disarming. The system disarm signal 65n propagates through the OR gate 514 to the reset inputs of the multivibrators 516 and 520. While the output signal of the OR gate 514 is active, the multivibrators 516 and 520 are placed in a reset state, effectively turning off indicator power 589 and 599, thereby turning off alarms when the system is disarmed.

While armed, an OR gate 518 permits an active output from either the attack signal 64n or from the output of the D-type flip-flop 526 to trigger the multivibrator 516. While triggered, the active output signal of the multivibrator 516 propagates through a current limiting resistor 590 to control the base of the Darlington transistor 591. When active, the output signal of the multivibrator causes the transistor 591 to engage the relay 592, and the resulting closure of the contact of said relay 592 activates the attack indicator power 599. Additionally, the active output of the multivibrator 516 propagates through the OR gate 530 and the current limiting resistor 580 to control the base of the second Darlington transistor 581. When active, the output signal causes the Darlington transistor 581 to engage the relay 582, and the resulting closure of the contacts of said relay 582 activates the tamper indicator power 589.

The switch 560 permits manual selection of when the hold signal 62n is in an active state. The proper switch selection depends on the type of attack and tamper indicators employed, and the feedback of the indicators to the system's sensors. Tamper warning indicators may or may not adversely interfere with the system's sensors. If the tamper warning signal will not itself set off an alarm signal, then the output signal of the multivibrator 516 should be used as the hold signal 62n. That is, if the tamper indicators do not feedback, the switch should be set so as to connect the output of the integrator 516 to the hold signal 62n. Attack indicators usually will adversely interfere with the system's sensors. The output signal selected by the switch 560 is connected to all of the hold signal 62n nodes, as shown in FIGS. 1, 3, 4, and 5. When the switch is connected to the output signal of the multivibrator 516, the status of the sensors is held only while an attack indicator is active (but not while a tamper indicator is active). When the switch 560 connects to the output of the OR gate 530, sensors are inhibited, or held, if either attack or tamper indicators are active.

The attack cycle signal generated by the multivibrator 516 is connected to the inverter 524. The inverter output triggers the resettable multivibrator 522 at the end of the attack signal. During the active output state of the multivibrator 522, the sensor input signals are enabled into the system since the interconnection between the multivibrator 522 and the OR gate 514 provides a means for keeping both tamper and attack indicators off and for keeping hold signal 62n inactive. The pulse duration of the multivibrator 522 output signal must be longer than the maximum duration of the sensor control conditioning circuits of FIGS. 1 and 3 to ensure that the sensor signals have adequate time to settle to a normal state (if one exists).

The end (i.e., the falling edge) of the output signal pulse generated by the multivibrator 522 is used to clock the input data of a D-type flip-flop 526 to its output. The input data clocked is the status of the tamper signal after it has had time to settle, as described above. If the tamper signal is still present at the falling edge, the active output state of the flip-flop 526 propagates through the OR gate 518 to re-trigger the multivibrator 516, whereby a new attack pulse is generated. If the tamper signal is not present at said falling edge, the normal (inactive) state output signal of the flip-flop 526 propagates through the OR gate 518 and no new cycle is generated. This allows an attack to start the supply of power to the attack and tamper indicators, and requires that the selected tamper threshold must not be active before the attack indications will cease.

Referring to FIGS. 1 and 5, the attack indicator power 599 is delivered to the attack deterrent indicator 91i. The tamper indicator power signal 589 is connected to the tamper warning indicator 90i. The indicators 90i and 91i can be any well known audible, visual, or anti-theft device applicable to the type of the response indication desired.

Other modifications are possible without departing from the spirit of the invention and will occur to those skilled in the art. For example, parameters such as no-activity time periods for sensors or the threshold trip level of the potentiometer 421 described as manually selectable or adjustable may instead be set to predetermined values. The description of the preferred embodiment is not to be taken in a limiting sense. The scope of the invention is best determined by reference to the appended claims.

What is claim is:

1. A vehicle security system, comprising:
   a plurality of environmentally sensitive sensors, each to the ambient environment and generating an output signal when activated;
   at least one environmentally insensitive sensor, insensitive to the ambient environment and generating an output signal when activated.
   alarm signal generating means for generating one of plural types of alarm signals in response to activation of said environmentally sensitive sensors and said at least one environmentally insensitive sensor; and
   control means for controlling the type of alarm signal generated by said alarm signal generating means, wherein said control means said alarm signal generating means to generate an attack alarm signal when said at least one environmentally insensitive sensor is activated and an attack alarm signal when a predetermined number of environmentally sensitive sensors are activated, said predetermined number being greater than one, and further wherein said control means control said alarm generating means to generate a tamper alarm signal when a number of environmentally sensitive sensor less than said predetermined number are activated.

2. The vehicle security system of claim 1 wherein all sensors are first synchronized together to ensure overlapping sensor detection signals to any sensor activation by prolonging the duration of each sensor's output signal by a predetermined amount.

3. The vehicle security system of claim 1 wherein said control means comprises combinational logic and timing elements.

4. The vehicle security system of claim 1 further including a first alarm indicator that is activated by said attack alarm signal and a second alarm indicator that is activated by said tamper alarm signal.

5. The vehicle security system of claim 2 wherein the quantity of activated sensors necessary to generate the attack alarm signal can be manually selected.

6. The vehicle security system of claim 2 wherein the quantity of activated sensors necessary to generate the attack alarm signal can be automatically adjusted by said control means so as to prevent a continuous attack alarm signal.

7. The vehicle security system of claim 1 further comprising automatic means for removing any sensor from operation if said sensor continues to generate an output signal for a predetermined time interval such that said removal will not adversely affect the operation of said control means for generating an attack alarm or tamper alarm signal.

8. The vehicle security system of claim 2 wherein said attack alarm signal is generated whenever a predetermined quantity of synchronized output signals stay active for a predetermined time interval.

9. A vehicle security system which detects a disturbance to a vehicle or the environment of the vehicle and generates an alarm signal representative of a type of disturbance, the system comprising:
   a plurality of sensors, comprising at least one environmentally insensitive sensor which generates an output signal in response to a disturbance to the vehicle and plural environmentally sensitive sensors each of which generates an output signal in response to a disturbance to the ambient environment of the vehicle; and control means for detecting output signals of said sensors and discriminating a disturbance as one of attack and tamper and generating one of an attack signal and a tamper signal, respectively, in accordance with detected output signals of said sensors, said attach signal initiating an attack deterrent response and said tamper signal initiating a tamper warning response;

wherein all sensors initially are synchronized by prolonging the duration of each output signal of each activated sensor to synchronize said output signals of said activation sensors such that overlapping output signals of activated sensors are designated for a single detected disturbance;

and further wherein said control means discriminates between an attack and a tamper type disturbance by qualifying a disturbance as said attack type disturbance if an output signal from any environmentally insensitive sensor is detected, said attack type disturbance if output signals from a first predetermined number of environmentally sensitive sensors are detected, and said tamper type disturbance if output signals from a second predetermined number of environmentally sensitive sensors are detected wherein said second predetermined number of environmentally sensitive sensors corresponding to said tamper type disturbance is less than said first predetermined number of environmentally sensitive sensors corresponding to said attack type disturbance.

10. The vehicle security system of claim 9 wherein an attack deterrent response is generated whenever a predetermined quantity of synchronized output signals stays active for a predetermined time interval.

11. The vehicle security system of claim 9 wherein an attack qualification threshold can be manually adjusted to require any quantity of synchronized output signals.

12. The vehicle security system of claim 9 wherein a tamper qualification threshold can be manually adjusted to require any quantity of synchronized output signals.

13. The vehicle security system of claim 9 wherein after an alarm signal has been generated, a predetermined time interval must pass to allow the system to stabilize before any of the detection sensors are permitted to cause a new alarm signal to be generated.

14. A vehicle security system of claim 13 wherein, upon completion of an attack deterrent response, the attack signal is recycled if the quantity of active sensors does not fall below said second predetermined number.

15. The vehicle security system of claim 9 wherein said first predetermined number can be automatically adjusted so as to prevent a continuous attack deterrent response.

16. The vehicle security system of claim 9 wherein said second predetermined number can be automatically adjusted so as to prevent a continuous tamper warning response.

17. The vehicle security system of claim 9 further comprising a manual control means for removing any sensor from operation wherein removal will not adversely affect attack versus tamper type disturbance discrimination.

18. The vehicle security system of claim 9 further comprising automatic means for removing any sensor from operation if said sensor continues to generate an output signal for a predetermined time interval wherein removal will not adversely affect attack versus tamper type disturbance discrimination.

19. The vehicle security system of claim 9 further comprising a first indicator that is activated by an attack alarm signal and a second indicator that is activated by a tamper alarm signal.

20. The vehicle security system of claim 19 wherein the second indicator is activated whenever the first indicator is activated.

21. A vehicle security system, comprising:
a plurality of sensors, comprising at least one environmentally insensitive sensor, each generating an output signal when activated, and plural environmentally sensitive sensors, each generating an output signal when activated;
an alarm signal generator which generates one of plural types of alarm signals in response to activation of said sensors, said alarm signal generator being capable of generating an attack alarm signal and a tamper alarm signal; and
a controller which controls a type of alarm signal generated by said alarm signal generator in accordance with output signals of said sensors, said controller controlling said alarm signal generator to generate said attack alarm signal when at least one environmentally insensitive sensor is activated and controlling said alarm signal generator to generate said attack alarm signal when a predetermined number of said environmentally sensitive sensors are activated, said predetermined number being greater than one, wherein said controller controls said alarm signal generator to generate said tamper signal when a number of environmentally sensitive sensors less than said predetermined number are activated.

22. The vehicle security system of claim 21 further comprising a first alarm indicator that is activated by the attack alarm signal and a second alarm indicator that is activated by the tamper alarm signal.

23. A system for controlling a type of alarm generated by a self-contained vehicle security alarm, comprising:
a plurality of environmentally sensitive sensors, each of which generates an output signal in response to a disturbance in the ambient environment of a vehicle; and
a controller which controls a type of alarm signal generated by said vehicle security alarm in response to output signals of said sensors, said controller outputting an attack control signal when a predetermined number of said sensors are activated, said predetermined number being greater than one, wherein said controller outputs a tamper control signal when a number of sensor less than said predetermined number are activated, and wherein the quantity of activated sensors necessary to generate the attack control signal can be automatically adjusted by said controller; and
wherein said vehicle security alarm is controlled to generate an attack alarm when said controller outputs said attack control signal and said vehicle security alarm is controlled to generate a tamper alarm when said controller outputs said tamper control signal, said tamper alarm being representative of a less intrusion into the security of a vehicle as compared to said attack alarm.

24. A system for controlling a type of alarm generated by a self-contained vehicle security alarm, comprising:

a plurality of environmentally sensitive sensors, each of which generates an output signal in response to a disturbance in the ambient environment of a vehicle; and a controller which controls a type of alarm signal generated by said vehicle security alarm in response to output signals of said sensors, said controller outputting an attack control signal when a predetermined number of said sensors are activated, said predetermined number being greater than one, wherein said controller outputs a tamper control signal when a number of sensor less than said predetermined number are activated; and automatic means for removing any sensor from operation if said sensor continues to generate an output signal for a predetermined time interval wherein removal does not adversely affect the operation of said controller to generate a control signal;

wherein said vehicle security alarm is controlled to generate an attack alarm when said controller outputs said attack control signal and said vehicle security alarm is controlled to generate a tamper alarm when said controller outputs said tamper control signal, said tamper alarm being representative of a less intrusion into the security of a vehicle as compared to said attack alarm.

25. A method of generating one of an attack alarm signal and a tamper alarm signal in a self-contained vehicle security system, the tamper alarm signal being representative of a lesser intrusion into the security of a vehicle as compared to the attack alarm signal, comprising the steps of:

providing a plurality of vehicle security sensors responsive to changes in the ambient environment of the vehicle;

generating an attack alarm signal when at least a predetermined number of said sensors are activated, said predetermined number being greater than one.

enabling the generation of a tamper alarm signal when a number of said sensors less than said predetermined number are activated; and removing from operation any sensor which generates an output signal for a predetermined time, wherein removal does not adversely affect generation of an alarm signal.

* * * * *

UNITED STATES PATENT AND TRADEMARK OFFICE
CERTIFICATE OF CORRECTION

PATENT NO. : 5,181,010                  Page 1 of 2
DATED : January 19, 1993
INVENTOR(S) : J. S. Chick It is certified that error appears in the above-indentified patent and that said Letters Patent is hereby corrected as shown below:

| COLUMN | LINE | ERROR |
|---|---|---|
| 1 | 49 | "4,574,,268" should read --5,574,268-- |
| 12 (Claim 1 | 2 Line 2) | after "each" insert --sensitive-- |
| 12 (Claim 1 | 15 Line 15) | after "means" insert --controls-- |
| 12 (Claim 1 | 22 Line 22) | "control" (second occurrence) should read --controls-- |
| 12 (Claim 1 | 22 Line 22) | after "alarm" insert --signal-- |
| 12 (Claim 1 | 24 Line 24) | "sensor" should read --sensors-- |
| 13 (Claim 9 | 6 Line 17) | "attach" should read --attack-- |
| 14 (Claim 23 | 53 Line 15) | "sensor" should read --sensors-- |

UNITED STATES PATENT AND TRADEMARK OFFICE
CERTIFICATE OF CORRECTION

PATENT NO. : 5,181,010
DATED : January 19, 1993
INVENTOR(S) : J. S. Chick

It is certified that error appears in the above-indentified patent and that said Letters Patent is hereby corrected as shown below:

| COLUMN | LINE | ERROR |
|---|---|---|
| 14 (Claim 23 | 64 Line 26) | "less" should read --lesser-- |
| 16 (Claim 24 | 1 Line 28) | "less" should read --lesser-- |
| 16 (Claim 25 | 15 Line 13) | "one." should read --one;-- |

Signed and Sealed this

Nineteenth Day of April, 1994

Attest:

BRUCE LEHMAN

Attesting Officer    Commissioner of Patents and Trademarks